(12) United States Patent
Smith

(10) Patent No.: US 6,369,863 B1
(45) Date of Patent: Apr. 9, 2002

(54) ALIGNING IMAGES OF A PROJECTION SYSTEM

(75) Inventor: Ronald D. Smith, Phoenix, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/258,053

(22) Filed: Feb. 26, 1999

(51) Int. Cl.[7] .............................. H04N 5/64; H04N 9/31
(52) U.S. Cl. .................. 348/744; 348/745; 348/746; 348/751; 348/790
(58) Field of Search ................... 348/744, 745, 348/746, 747, 751, 790, 791, 766, 806, 190, 191; H04N 5/64, 9/31, 3/22, 3/26, 3/28, 3/223, 3/227

(56) References Cited

U.S. PATENT DOCUMENTS

| 5,299,039 A | * | 3/1994 | Bohannon | 359/53 |
| 5,459,532 A | * | 10/1995 | Baba | 348/745 |
| 5,475,428 A | * | 12/1995 | Hintz et al. | 348/745 |
| 5,475,447 A | * | 12/1995 | Funado | 348/745 |
| 5,793,446 A | * | 8/1998 | Nose et al. | 348/744 |
| 5,860,721 A | * | 1/1999 | Bowron et al. | 353/101 |
| 6,188,382 B1 | * | 2/2001 | Okamura et al. | 345/132 |

* cited by examiner

Primary Examiner—Michael Lee
Assistant Examiner—Trang U. Tran
(74) Attorney, Agent, or Firm—Trop, Pruner & Hu, P.C.

(57) ABSTRACT

A projection system includes a light source, a display panel and a first circuit. The light source is adapted to generate light, and the display panel includes pixels to modulate at least a portion of the light to produce a modulated beam image. The pixels are formed from groups of subpixel cells, and the display panel is adapted to reorganize the groups to shift positions of the pixels. The first circuit is coupled to the display panel to reorganize the groups.

19 Claims, 7 Drawing Sheets

ALIGNING IMAGES OF A PROJECTION SYSTEM

BACKGROUND

The invention relates to aligning images of a projection system, such as a liquid crystal display (LCD) projection system, for example.

Referring to FIG. 1, a reflective liquid crystal display (LCD) projection system 5 typically includes an LCD display panel (LCD display panels 22, 24 and 26, as examples) for each primary color that is projected onto a screen 10. In this manner, for a red-green-blue (RGB) color space, the projection system 5 may include an LCD display panel 22 that is associated with the red color band, an LCD display panel 24 that is associated with the green color band and an LCD display panel 26 that is associated with the blue color band. Each of the LCD display panels 22, 24 and 26 modulates light from a light source 30 to form red, green and blue images, respectively, that add together to form a composite color image on the screen 10. To accomplish this, each LCD display panel 22, 24 or 26 receives electrical signals that indicate the corresponding modulated beam image to be formed.

More particularly, the projection system 5 may include a beam splitter 14 that directs a substantially collimated white beam 11 of light (provided by the light source 30) to optics that separate the white beam 11 into red 13, blue 17 and green 21 beams. In this manner, the white beam 11 may be directed to a red dichroic mirror 18 that reflects the red beam 13 toward the LCD display panel 22 that, in turn, modulates the red beam 13. The blue beam 17 passes through the red dichroic mirror 18 to a blue dichroic mirror 20 that reflects the blue beam 17 toward the LCD display panel 26 for modulation. The green beam 21 passes through the red 18 and blue 20 dichroic mirrors for modulation by the LCD display panel 24.

For reflective LCD display panels, each LCD display panel 22, 26 and 24 modulates the incident beams, and reflects the modulated beams 15, 19 and 23, respectively, so that the modulated beams 15, 19 and 23 return along the paths described above to the beam splitter 14. The beam splitter 14, in turn, directs the modulated beams 15, 19 and 23 through projection optics, such as a lens 12, to form modulated beam images that ideally overlap and combine to form the composite image on the screen 10.

However, for purposes of forming a correct composite image on the screen 10, the corresponding pixels of the modulated beam images may need to align with each other. For example, a pixel of the composite image at location (0,0) may be formed from the superposition of a pixel at location (0,0) of the modulated red beam image, a pixel at location (0,0) of the modulated green beam image and a pixel at location (0,0) of the modulated blue beam image. Without this alignment, the color of the pixel at location (0,0) may be incorrect, or the color may vary across the pixel.

At the time of manufacture of the system 5, the LCD display panels 22, 24 and 26 typically are mounted with sufficient accuracy to align the pixels of the modulated beam images. One way to accomplish this is to approximate the correct position of the LCD display panels 22, 24 and 26; temporarily mount the LCD display panels 22, 24 and 26; and thereafter use the LCD display panels 22, 24 and 26 to attempt to form a white rectangular composite image onto the screen 10 to test the alignment of the display panels 22, 24 and 26. Referring to FIG. 2, if the LCD display panels 22, 24 and 26 are not properly aligned, then the resultant red 40, green 42 and blue 44 modulated beam images do not align, an alignment problem that may be apparent throughout the entire composite image. However, when the LCD display panels 22, 24 and 26 are properly aligned, the modulated beam images align and are not detectable from the composite image, as depicted in FIG. 3.

Unfortunately, aligning the LCD display panels 22, 24 and 26 to cause beam convergence may require a high degree of accuracy in the assembly of the system 5. Furthermore, such factors as aging and thermal drift, may cause the LCD display panels 22, 24 and 26 to fall out of alignment during the lifetime of the system 5.

Thus, there is a continuing need to address one or more of the above-stated problems.

SUMMARY

In one embodiment of the invention, a projection system includes a light source, a display panel and a first circuit. The light source is adapted to generate light, and the display panel includes pixels to, modulate at least a portion of the light to produce a modulated beam image. The pixels are formed from groups of subpixel cells, and the display panel is adapted to reorganize the groups to shift positions of the pixels. The first circuit is coupled to the display panel to selectively cause the display panel to reorganize the groups.

In another embodiment, a method includes modulating beams of light with display panels to form a first modulated beam image and a second modulated beam image. The display panel includes display pixels, and the display pixels are associated with image pixels of the first and second modulated beam images. Without moving any of the display panels, the positions of some of the display pixels are changed to move the first modulated beam image with respect to the second modulated beam image.

In another embodiment, a method includes generating light and using pixels to modulate at least a portion of the light to produce a modulated beam image. At least two subpixel cells are grouped together to form each display pixel. The grouping of the subpixel cells is changed to shift positions of the display pixels.

In yet another embodiment, a display panel includes subpixel cells and a switch circuit. The switch circuit is adapted to form display pixels by grouping the subpixel cells and change the grouping of the subpixel cells to shift positions of the pixels.

DETAILED DESCRIPTION

Figure 1:
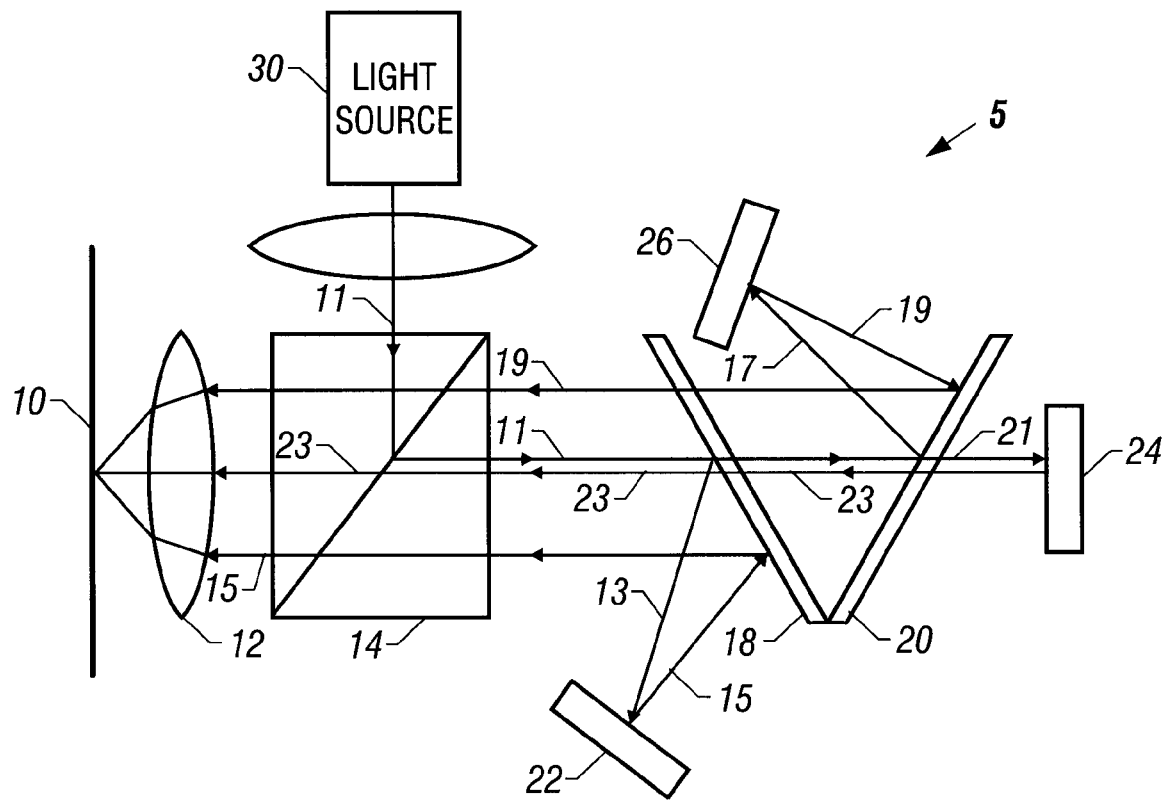
FIG. 1 is a schematic diagram of a LCD projection system of the prior art.
Figure 2:
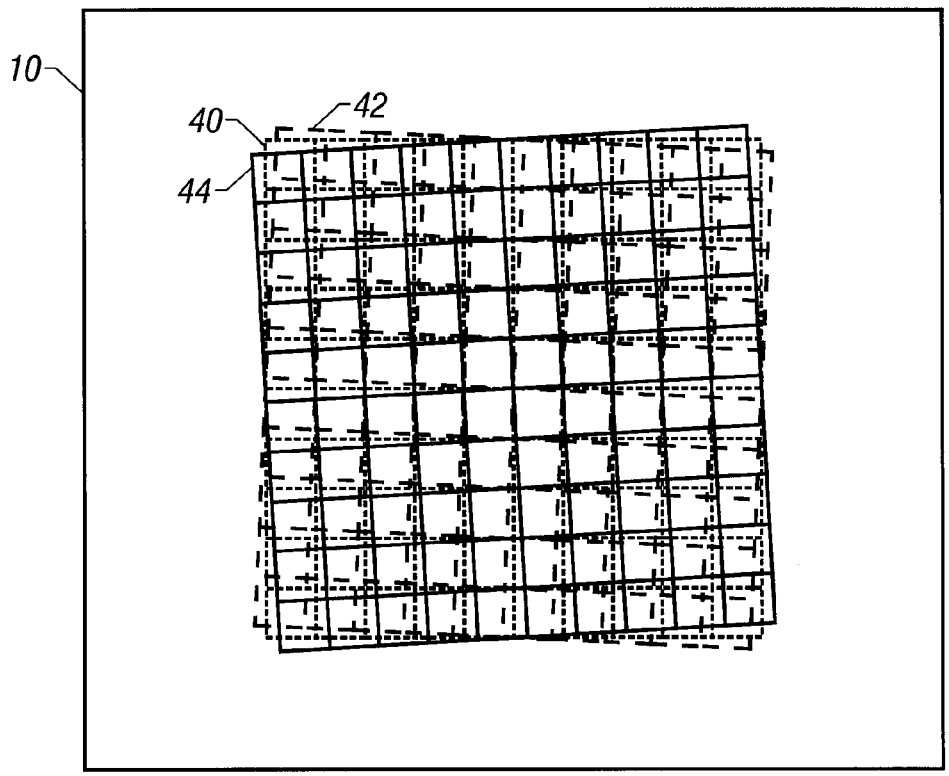
FIG. 2 is an illustration of images formed by LCD display panels of the system of FIG. 1 when the panels are not aligned.
Figure 3:
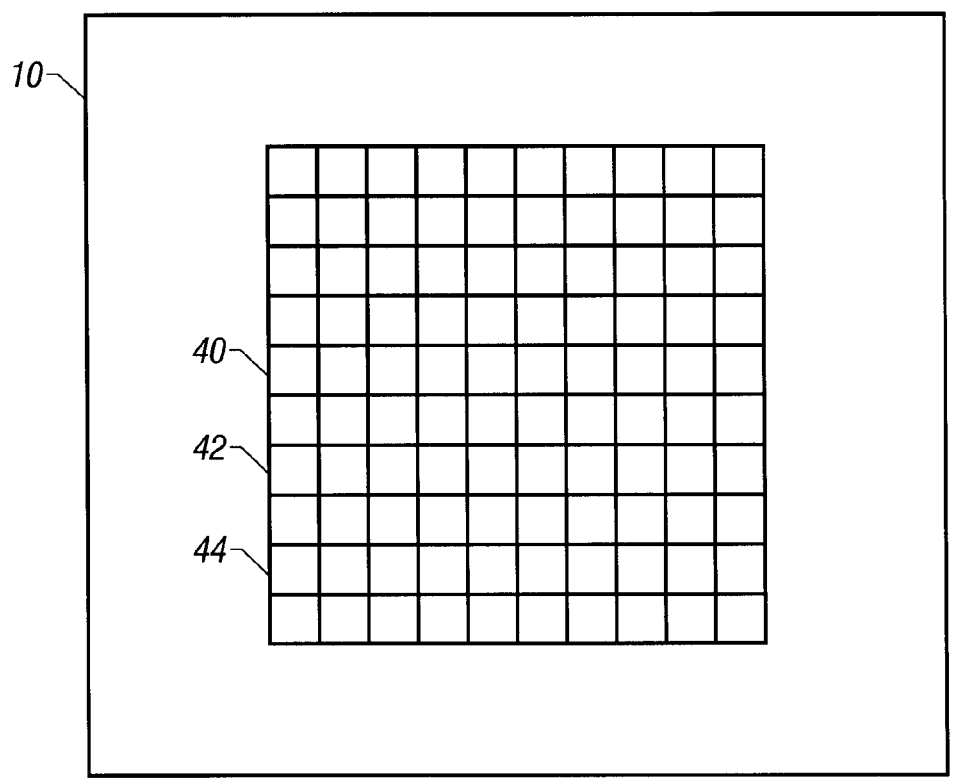
FIG. 3 is an illustration of an image formed by LCD panels of the system of FIG. 1 when the panels are aligned.
Figure 4:
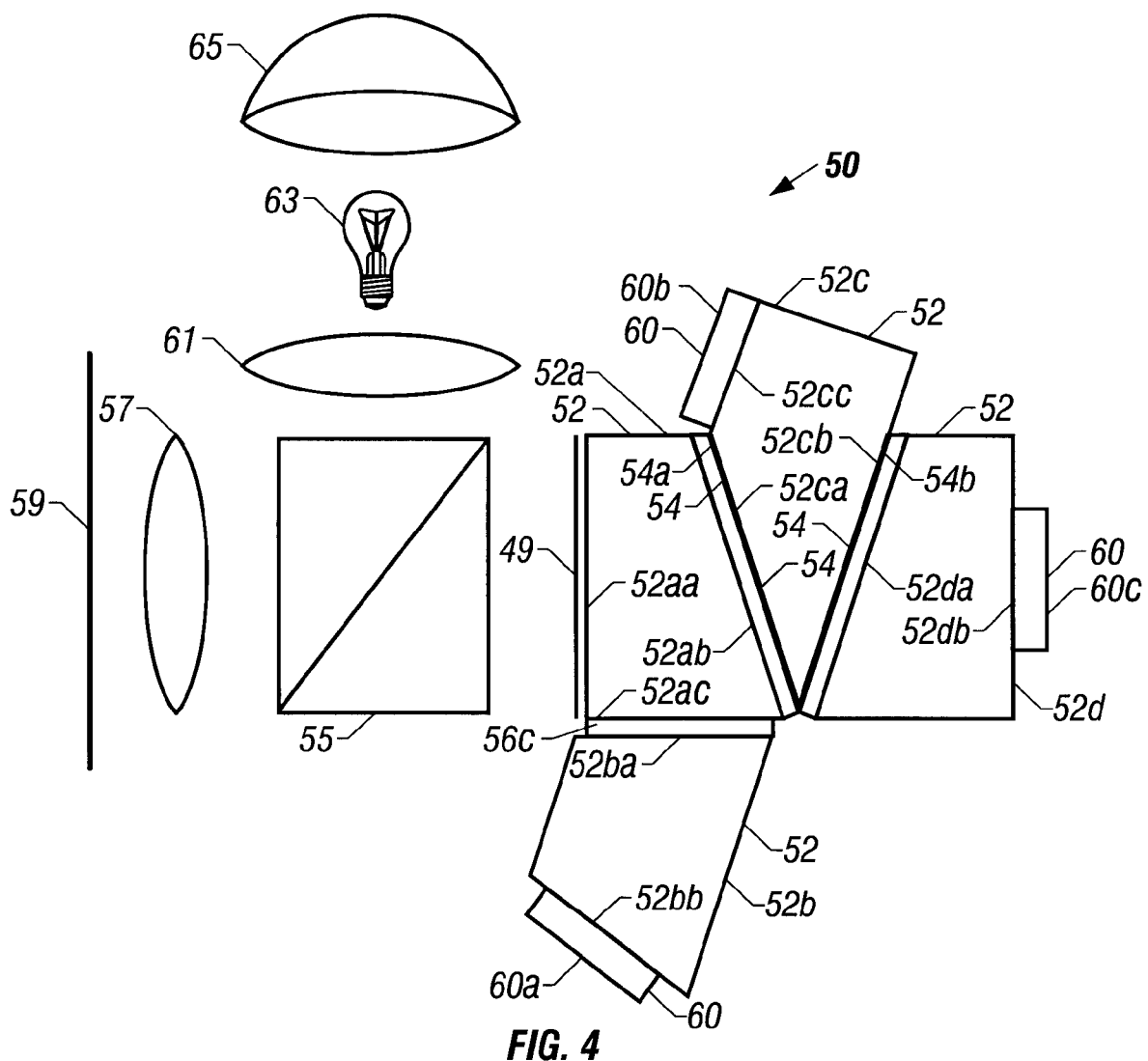
FIG. 4 is a schematic diagram of a projection system according to an embodiment of the invention.

Referring to FIG. 4, an embodiment 50 of a projection system in accordance with the invention has electrical features to cause the convergence of modulated beams images (modulated red, green and blue images, for example) that collectively form a composite image on a screen 59. In particular, in some embodiments, during calibration, the projection system 50 may use these electrical features to selectively rotate and translate the modulated beam images that are formed by display panels 60 (display panels 60a, 60b and 60c, as examples) without physically altering the positions of the display panels 60. As a result, at the time of manufacture, the display panels 60 may be mounted without a high degree of precision. Furthermore, during the lifetime of the projection system 50, the positions of the beams may be re-calibrated without remounting or repositioning the display panels 60. In some embodiments, the projection system 50 may be a liquid crystal display (LCD) projection system, and the display panels 60 may be reflective LCD display panels. Other arrangements are possible.

Figure 5:
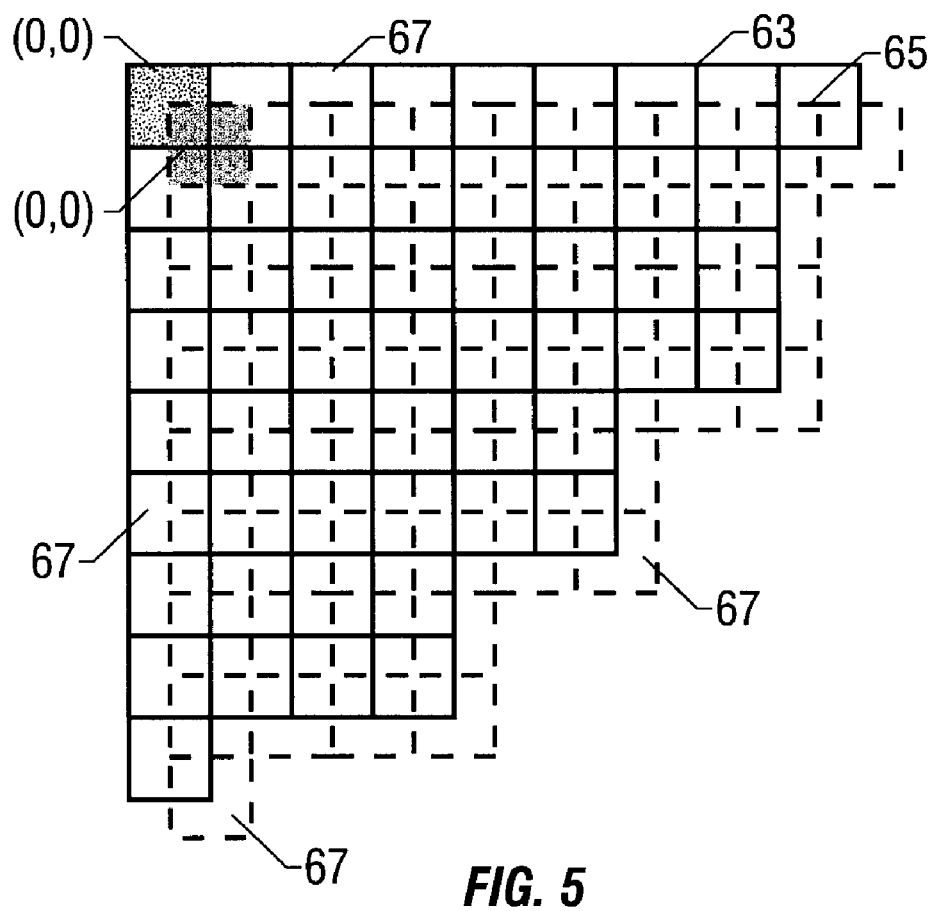
FIG. 5 is an illustration of an alignment scenario between two images projected by display panels of the projection system of FIG. 4.

More particularly, FIG. 5 illustrates two modulated beam images 63 (represented by solid lines) and 65 (represented by dashed lines), each of which is formed by a different display panel 60. Each pixel 67 of the beam image 63 is located ½ pixel from the corresponding pixel 67 of the beam image 65, i.e., the beam images 63 and 65 are "½ pixel" out of alignment. Thus, the pixel 67 at cartesian coordinate location (0,0) of the image 65 is ½ pixel away from the pixel 67 at location (0,0) of the image 63. To cause the two beam images 63 and 65 to converge, the projection system 50 may generate internal signals (described below) that may be applied to one or both of the display panels 60 that generate the images 63 and 65 to cause the display panel(s) 60 to shift the modulated beam image(s) to adjust beam convergence.

Figure 6:
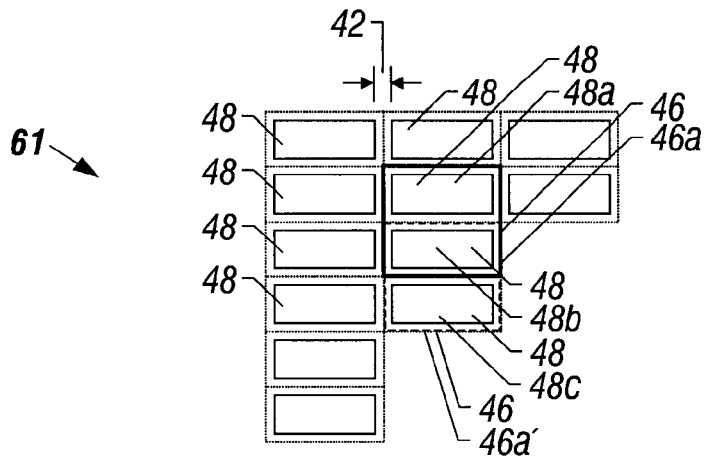
FIG. 6 is an illustration of the arrangement of subpixel cells of the display panel according to an embodiment of the invention.

Each pixel 67 of a modulated beam image may be formed from a corresponding pixel 46 (see FIG. 6, described below) of a display panel 60, and the position of the pixel 46 may be shifted by ½ pixel (for example) in response to the internal signals. As an example, FIG. 6 depicts a portion 61 of a display panel 60 and illustrates that, in some embodiments, each pixel 46 of the display panel 60 may be formed from a group (a group of two, for example) of subpixel cells 48. In this manner, the display panel 60 may be controlled via the internal signals to selectively group the subpixel cells 48 to form the pixels 46, a flexibility that permits shifting of the positions of the pixels 46, as described below.

In some embodiments, the subpixel cells 48 may be arranged in a rectangular array of rows and columns, and each pixel 46 may be formed from two adjacent subpixel cells 48 of the same column. Thus, as depicted in FIG. 6, a particular pixel 46a may be formed from subpixel cells 48a and 48b, each of which forms ½ of the pixel 46. In response to the assertion of a signal (called SPLIT, described below), all pixels 46 that are in the same column as the pixel 46a may be effectively shifted in a downward direction by ½ pixel. In this manner, the assertion of the SPLIT signal causes the subpixel cells 48 of the column to reorganize, or regroup, so that the pixel 46a becomes the pixel 46a'. The pixel 46a' includes the subpixel cells 48b and 48c and does not include the subpixel cell 48a.

Many other embodiments are possible. For example, in response to the assertion of the SPLIT signal, a column of pixels 46 may be shifted in an upper direction by ½ pixel, or a row of pixels 46 may be shifted to the right by ½ pixel or shifted to the left by ½ pixel. Also, more than two subpixel cells 48 may form each pixel 46. Furthermore, in some embodiments, the shifts may cause less or more than a ½ pixel shift. For example, in other embodiments, each pixel 46 may be formed by four subpixel cells 48, and as a result, each pixel 46 may be shifted by ¼ pixel in response to the assertion of the SPLIT signal. In some embodiments, the number of subpixel cells 48 that are used to form each pixel 46 may be limited by an inter-pixel gap 42, a minimum spacing to ensure the subpixel cells 48 do not short out.

As described below, the shifting of a particular column of pixels 46 may be controlled by an associated SPLIT signal, where the notation denotes the coordinate position of the column. As an example, in some embodiments, when the $SPLIT_{100}$ signal is asserted (driven high, for example), the pixels 46 of column 100 may be shifted in a downward direction by approximately ½ pixel.

Figure 9:
FIG. 9 is an illustration of portions of two modulated beam images before alignment.

The above-described techniques may be used to adjust for fine, or local, adjustment of the pixel positions i.e., an adjustment that is approximately less than one pixel in a particular direction. However, more coarse, or global, adjustments may be desired, i.e., adjustments greater than about one pixel may be desired. In some embodiments, these global adjustments may be performed by remapping pixel positions, as described below. For example, two modulated beams may be rotated with respect to each other, as depicted in FIG. 9, by a row 62 of pixels of a modulated beam image being rotated with respect to a row 64 of pixels of another modulated beam image. To cause the modulated beam images to converge, the columns of one of the beam images may be subdivided into segments, and these segments may be selectively shifted (as described above) and remapped (as described below) to cause beam convergence.

Figure 10:
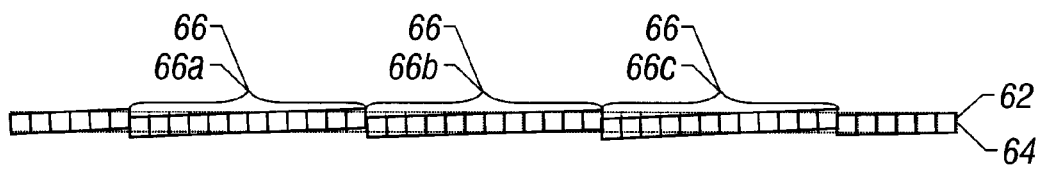
FIG. 10 is an illustration of portions of the two modulated beam images after alignment.

For example, referring to FIG. 10, using the rows 62 and 64 to illustrate the rotation, the row 62 may be conceptually divided into segments 66 (segments 66a, 66b and 66c, as examples) that are selectively shifted down and remapped to substantially align the rows 62 and 64. In this manner, the shifting and apparent rotation of the row 62 is performed by the shifting and rotation of the pixels 46 of the display panel 60 that form the row 62. Although each segment 66 of the row 62 may have the same slope both before and after alignment, local and global shifting of the segments 66 in the vertical direction may be used to substantially aligns the two rows 62 and 64, as described below.

The local realignment of a particular segment 66 may be accomplished by shifting the pixels 46 that form the segment 66 in a downward direction by ½ pixel using the technique of selectively regrouping subpixel cells 48, described above. The global realignment of the segment 66 may be accomplished by remapping the coordinates of the pixels 46 that form the segment 66. For this to occur, the display panel 60 may include extra subpixel cells 48 in addition to the number of subpixel cells that are used to furnish the desired image resolution.

Figure 8:
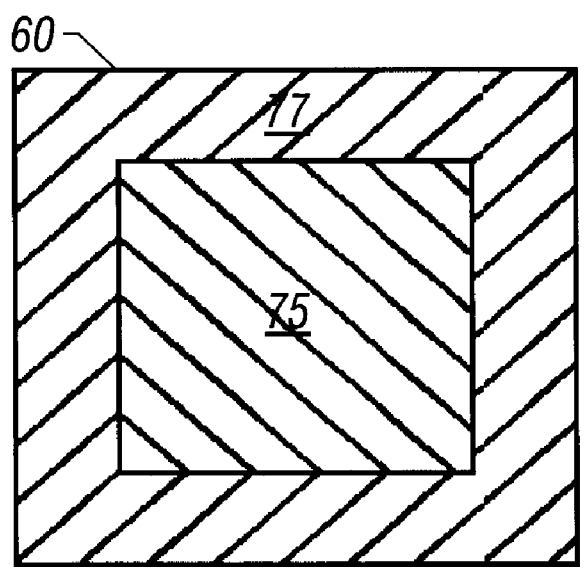
FIG. 8 is an illustration of a display panel according to an embodiment of the invention.

Referring to FIG. 8, as an example, the display panel 60 may include a block 75 of active pixels (that are currently being used to form an image) and inactive pixels 77 (i.e., that are turned off pixels) that may become part of the active block 75 due to remapping. Thus, the block 75 of active pixels 46 is driven by electrical signals that represent a pixel image and the needed modulation. To define which pixels 46 form the active block 75, the projection system 50 may apply a mapping transformation to transform coordinates of an image space in which the pixel image is defined to coordinates that identify the active block 75. The mapping transformation, in turn, may globally reposition the modulated beam image that is formed by the display panel 60. As an example, for a desired resolution of 1024 horizontal pixels by 768 vertical pixels (i.e., for a 1024×768 display), the display panel 60 may have 1034 horizontal pixels by 778 vertical pixels, i.e., ten extra pixels in each direction.

Referring back to FIG. 10, as an example, the above-described techniques may be applied to substantially align the rows 62 and 64. For this example, each pixel 46 is assumed to be formed from two subpixel cells 48, and the alignment error may be kept under ¼ pixel, as described below. In particular, the pixels 46 that form the segment 66a of the row 62 may be shifted down by ½ pixel by asserting the appropriate SPLIT signals. This shift causes the leftmost pixel of the segment 66a to be shifted down by ¼ of a pixel from the corresponding pixel of the row 64 and causes the rightmost pixel 46 of the segment 66a to be located ¼ pixel above the corresponding pixel 46 of the row 64. The next segment 66b of the row 62 is apparently rotated by remapping the pixels 46 that form the segment 66b down by one pixel 46 and by not shifting the pixels 46 of the segment 66b. As a result, the leftmost pixel of the segment 66c is located ¼ of a pixel down from the corresponding pixel of the row 64, and the rightmost pixel of the segment 66c is located ¼ of a pixel up from the corresponding pixel of the row 64. The next segment 66c is formed by asserting the appropriate SPLIT signals for the corresponding pixels 46 and by remapping the corresponding pixels 46 down by one row. The next segment 66d is formed by remapping the pixels down by two pixels and not shifting the pixels.

Thus, to summarize the rotation techniques used in this example, the above-described sequence may be repeated to effectively rotate the row 62: every two segments 66, the corresponding pixels 46 are remapped down one additional pixel, and the SPLIT signals are asserted for every other segment to shift the positions of the pixels 46 of the segment 66 by ½ pixel.

Referring back to FIG. 4, in some embodiments, the projection system 50 may include prisms 52 (prisms 52a, 52b, 52c and 52d, as examples) that direct an incoming beam of white light (formed from red, green and blue beams) from a light source 63 to the display panels 60, as described below. In particular, the prism 52a receives the incoming white beam of light at a prism face 52aa that is normal to the incoming light and directs the beam to a prism face 52ab that is inclined toward the face 52aa. The reflective face of a red dichroic mirror 54a may be mounted to the prism face 52ab or to the prism face 52ca by a transparent adhesive layer.

The red dichroic mirror 54a separates the red beam from the incoming white beam by reflecting the red beam so that the red beam exits another prism face 52ac of the prism 52a and enters a prism face 52ba of the prism 52b. The prism faces 52ac and 52ba may be mounted together via a transparent adhesive layer. The prism 52b, in turn, directs the red beam to the incident face of the display panel 60a that is mounted to another prism face 52bb of the prism 52b that is inclined toward the prism face 52ba. The display panel 60a modulates the incident red beam, and the modulated red beam follows a similar path to the path followed by the incident red beam. However, instead of being directed toward the light source 63, a beam splitter 55 directs the modulated red beam through projection optics 57 (a lens, for example) that forms an image of the modulated red beam on the screen 59.

The remaining blue and green beams (from the original incoming white beam) pass through the red dichroic mirror 54a. The opposite face of the mirror 54a is attached to a prism face 52ca of the prism 52c, an arrangement that causes the blue and green beams to pass through the red dichroic mirror 54a, pass through the prism face 52ca of the prism 52c, travel through the prism 52c and pass through a prism face 52cb (of the prism 52c) that forms an acute angle with the prism face 52ca. The reflective face of a blue dichroic mirror 54b is mounted to the prism face 52cb. As a result, the blue dichroic mirror 54b reflects the blue beam back into the prism 52c to cause the blue beam to exit another prism face 52cc of the prism 52c. The incident face of the display panel 60b is mounted to the face 52cc and modulates the incident blue beam. The modulated blue beam, in turn, follows a path similar to the path followed by the incident blue beam. The beam splitter 55 directs the modulated blue beam through the projection optics 57 to form an image of the modulated blue beam on the screen 59.

The green beam passes through the blue dichroic mirror 54b and enters the prism 52d through a prism face 52da that may be mounted to the other face of the blue dichroic mirror 54b via a transparent adhesive layer. The green incident beam exits another prism face 52db of the prism 52d to strike the incident face of the display panel 60c that is mounted to the prism face 52db. The display panel 60c modulates the incident green beam before reflecting the modulated green beam along a path similar to the path followed by the incident green beam. The beam splitter 55 directs the modulated green beam through the projection optics 57 to form an image of the modulated green beam on the screen 59. The three modulated beam images form a color composite image on the screen 59.

The projection system 50 depicted in FIG. 4 is an example of one of many possible embodiments of the invention. Other projection systems, prism arrangements and optical systems are possible.

Figure 7:
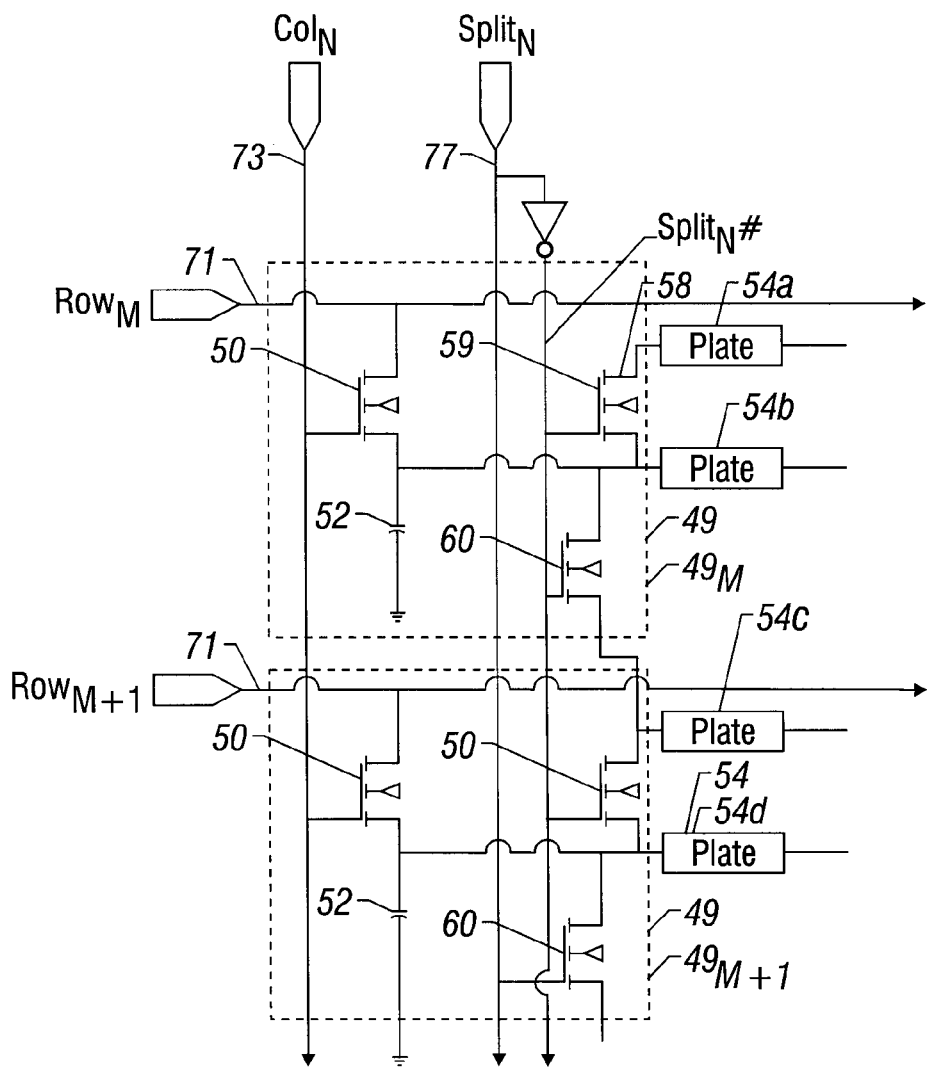
FIG. 7 is a schematic diagram of circuitry of the display panel according to an embodiment of the invention.

Referring to FIG. 7, the display panel 60 may include the following circuitry, a portion of which is depicted in FIG. 7. In particular, the display panel 60 may include row lines 71, column lines 73 and split lines 77 (each receiving a different SPLIT signal) to selectively activate the pixels 46 and selectively group the subpixel cells 48 to form the pixels 46. In this manner, each pixel 46 may be uniquely addressed by the assertion of one of the row lines 71 and one of the column lines 73. As an example, the split line 77 and the column line 73 shown in FIG. 7 receive $SPLIT_N$ and $COL_N$ signals, respectively; one of the row lines 71 shown in FIG. 7 receives a $ROW_M$ signal; and the other row line 71 receives a $ROW_{M+1}$ signal.

The split lines 77, in turn, control the grouping of the subpixel cells 48. More particularly, the optical output signal of each subpixel cell 48 may be controlled via an associated electrode plate 54 (plates 54a, 54b, 54c and 54d, as examples), and electrode plates 54 of the same pixel 46 are electrically coupled together to group form the subpixel cells 48 for that pixel 46. The grouping of the subpixel cells 48 is controlled by switch circuits 49 (switch circuits $49_M$ and $49_{M+1}$, as examples), each of which is associated with three electrode plates 54. Except for the plates 54 that are associated with the subpixel cells 48 at the edge of the display panel 60, each electrode plate 54 is associated in common with two switch circuits 49, an association that permits the shifting, as described below.

As an example, the switch circuit $49_M$ is associated with three electrode plates 54a, 54b and 54c; and the switch circuit $49_{M+1}$ is associated with the electrode plate 54c, the electrode plate 54d and another electrode plate (not shown). Thus, the switch circuits $49_M$ and $49_{M+1}$ are both associated with the electrode plate 54b. In this manner, when the $SPLIT_N$ signal is deasserted (driven low, for example), the switch circuit $49_M$ directs a voltage from the associated row line 71 to the electrode plates 54a and 54b to activate the subpixel cells 48 that are coupled to the electrode plates 54a and 54b. However, when the $SPLIT_N$ signal is asserted (driven high, for example), the switch circuit $49_M$ directs the voltage from the associated row line 71 to the electrode plates 54b and 54c, an action that shifts the associated pixel 46 by ½ pixel.

In some embodiments, the switch circuit 49a may include an n-channel metal-oxide-semiconductor (nMOS) field effect transistor 59 that has its drain-source path coupled between the electrode plates 54a and 54b, and its gate coupled to a signal called $SPLIT_N\#$ that is the inverse of the $SPLIT_N$ signal. The electrode plate 54b is coupled to a capacitor 52 that stores a charge indicative of a voltage that is supplied by the row line 71 when the column line 73 is asserted. The coupling of the row line 71 to the capacitor 52 occurs due to an nMOS transistor 50 that has its drain-source path coupled between the row line 71 and the capacitor 52. The gate of the transistor 50 is coupled to the column line 73 to selectively cause the transistor 50 to conduct. The electrode plate 54b may be selectively coupled to the plate 54c via the drain-source path of a nMOS transistor 60. The gate of the transistor 60 is coupled to the split line 75 and thus, is selectively activated by the SPLIT signal. The other switch circuits 49 may have a design similar to the switch circuit $49_M$.

Figure 11:
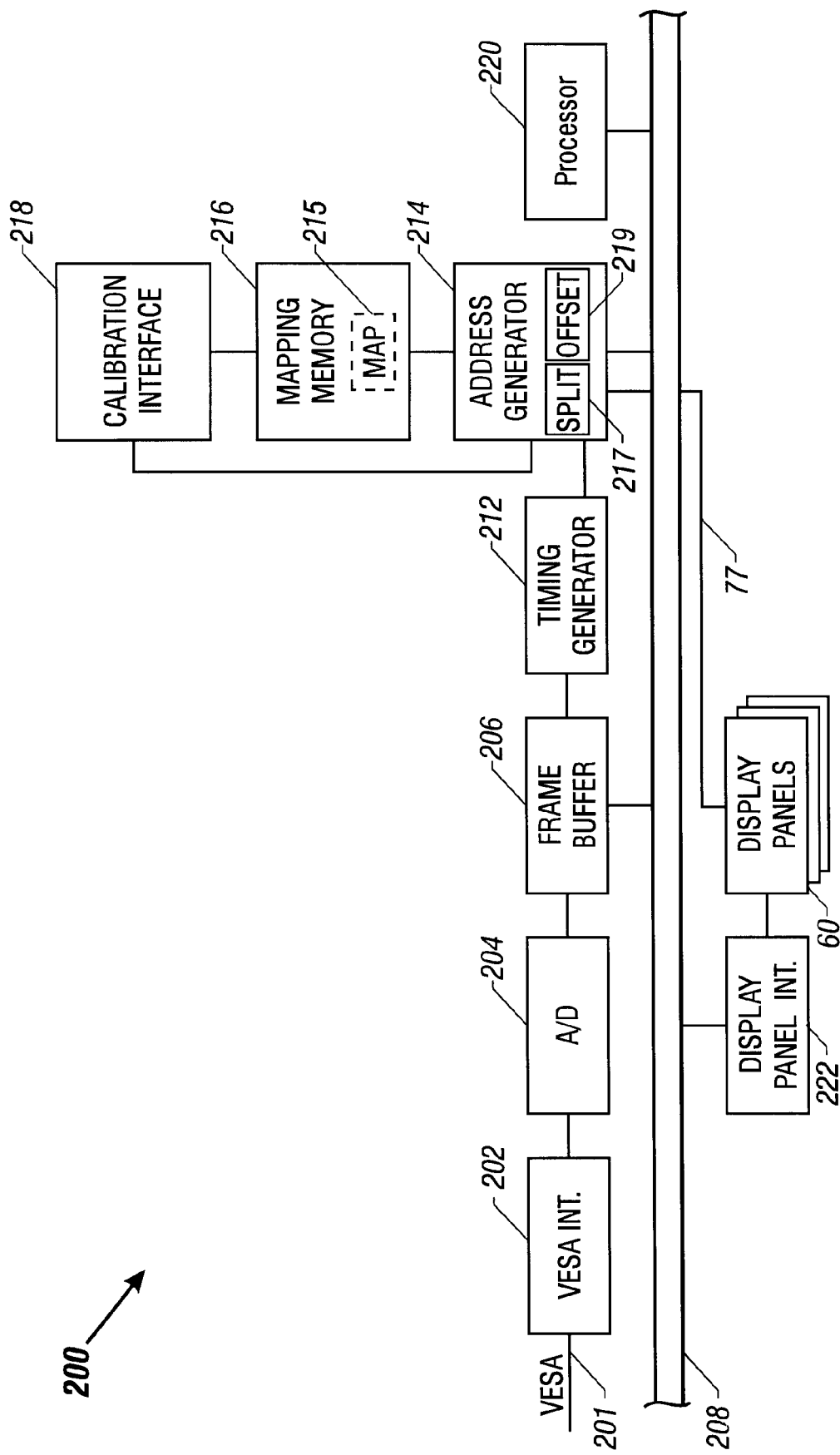
FIG. 11 is an electrical schematic diagram of the projection system of FIG. 4 according to an embodiment of the invention.

Referring to FIG. 11, the projection system 50 may include the following electrical system 200 that may be part of a computer system, for example, or part of a stand-alone projector. In particular, the electrical system 200 may include a Video Electronics Standards Association (VESA) interface 202 to receive analog signals from a VESA cable 201. The VESA standard is further described in the Computer Display Timing Specification, v.1, rev. 0.8 that is available on the Internet at www.vesa.org/standards.html. These analog signals indicate images to be formed on the display 59 and may be generated by a graphics card of a computer, for example. The analog signals are converted into digital signals by an analog-to-digital (A/D) converter 204, and the digital signals are stored in a frame buffer 206. A timing generator 212 may be coupled to the frame buffer 206 and regulate a frame rate at which images are formed on the screen 59. A processor 220 (one or more central processing units (CPUs), microcontrollers or microprocessors, as examples) may be coupled to the frame buffer 206 via a bus 208.

The processor 220 may process the data stored in the frame buffer 206 to, as examples, transform the coordinate space used by the graphics card into the coordinate space used by the display panels 60, remap the color space used by the graphics card into the color space used by the display panels 60 and cause the data to conform to the gamma function of the display panels 60. The end product of these operations is a set of RGB values for each pixel of the image. In this manner, the R values may be used to form the intensity values of the pixels of the display panel 60a, the G values may be used to form the intensity values of the pixels of the display panel 60c and the B values may be used to form the intensity values of the pixels of the display panel 60b.

Figure 12:
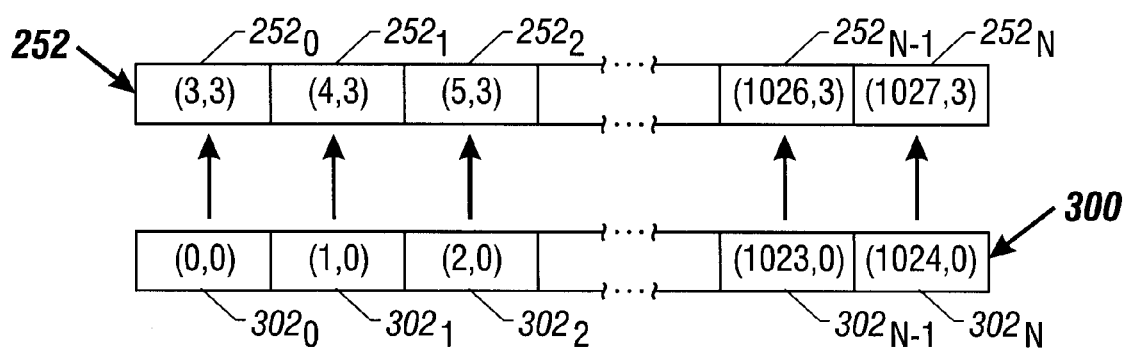
FIG. 12 is an illustration of a portion of a pixel map.

As described above, not all of the pixels of a particular display panel 60 may be used. Instead, a map 215 may be stored in a mapping memory 216 that indicates the desired mapping transformation. The map 215, in turn, may be used by an address generator 214 that generates the pixel addresses for pixels of the display panels 60. Referring to FIG. 12, as an example, for a particular display panel 60, P locations 252 (locations $252_1$, $252_2$, $252_3$, . . . $252_P$) of the map 215 may sequentially indicate the mapping for the uppermost row 300 of a pixel image, for example, beginning with a pixel $302_0$ of the row 300 that is at location (0,0). As shown, the pixel $302_0$ at location (0,0) maps into the pixel 46 at location (3,3) of the display panel 60; the pixel $302_1$ at location (1,0) maps into the pixel 46 at location (4,3) of the display panel 60; the pixel $302_2$ at location (2,0) maps into the pixel 46 at location (5,3) of the display panel 60; etc.

Among the other features of the system 200, the system 200 may include a display panel interface 222 that is coupled to the bus 208 and drives the display panel voltages to form the images on the display panels 60 in response to signals that are furnished by the frame buffer 206 and the address generator 214. A calibration interface 218 (an electromechanical user interface or a serial bus interface, as examples) may be electrically coupled to the address generator 214. In this manner, the calibration interface 218 may modify the map 215 in response to the desired calibration that is indicated by the interface 218 in the following manner. In particular the address generator 214 may include a split register 217 that may indicate, for example, the number of pixel columns that are in each split/unsplit group of pixels 46. For the example depicted in FIG. 10, each split/unsplit group includes two segments 66, i.e., twenty-four pixel columns. The address generator 214 may also include an offset register 219 to indicate how many pixel columns are in each mapping. For the example depicted in FIG. 10, twenty-four pixel columns are in each mapping. Thus, if no rotation is needed, the offset register 219 may indicate the total number of pixel columns. The address generator 214 furnishes the SPLIT signals and modifies the map 215 in accordance with the values stored in the offset 219 and split 217 registers.

While the invention has been disclosed with respect to a limited number of embodiments, those skilled in the art, having the benefit of this disclosure will appreciate numerous modifications and variations therefrom. It is intended that the appended claims cover all such modifications and variations as fall within the true spirit and scope of the invention.

What is claimed is:

1. A projection system comprising:
   a light source adapted to generate light;
   a first display panel including display pixels to modulate at least a portion of the light to produce a modulated beam image, each display pixel being formed from a group of subpixel cells of the display panel and the first display panel adapted to reorganize the groups to shift positions of the display pixels; and
   a first circuit coupled to the first display panel to selectively cause the first display panel to reorganize the groups.

2. The projection system of claim 1, wherein the first display panel comprises:

a switch circuit coupled to the subpixel cells and the first circuit, the switch adapted to selectively couple the subpixel cells together to reorganize at least one of the groups.

3. The projection system of claim 1, wherein the first display panel comprises a liquid crystal display panel.

4. The projection system of claim 1, further comprising:

additional display panels to modulate at least a portion of the light to produce additional modulated beam images, and wherein the first circuit is further adapted to regulate the first display panel to cause the modulated beam image produced by the first display panel to converge with one of the additional beam images.

5. The projection system of claim 1, wherein the first circuit comprises:

an address generator to selectively route signals indicative of the modulated beam image to the first display panel; and a memory adapted to store a map used by the address generator to perform the routing.

6. The projection system of claim 5, wherein the modulated beam image includes image pixels and the map indicates a mapping between the image pixels and the display pixels.

7. A method comprising:

generating light;

using display pixels of a display panel to modulate at least a portion of the light to produce a first modulated beam image;

grouping of at least two subpixel cells of the display panel together to form each display pixel; and changing the grouping of the subpixel cells to shift positions of the display pixels.

8. The method of claim 7, wherein the act of grouping comprises:

selectively coupling the subpixel cells together.

9. The method of claim 7, wherein the act of changing comprises:

decoupling some of the subpixel cells; and coupling additional subpixel cells that are not coupled to each other together.

10. The method of claim 7, further comprising:

modulating at least a portion of the light to produce additional modulated beam images; and regulating the changing to cause the first modulated beam image to converge with one of the additional modulated beam images.

11. A display panel comprising:

subpixel cells; and a switch circuit adapted to:

form display pixels by grouping the subpixel cells together, each display pixel formed from at least two subpixel cells; and change the grouping of the subpixel cells to shift positions of the pixels.

12. The display panel of claim 10, wherein the display panel comprises a liquid crystal display panel.

13. A computer system comprising:

a processor adapted to generate an indication of a pixel image;

a light source adapted to generate light;

a first circuit to regulate the position of a modulated beam image; and a first display panel coupled to the first circuit and including display pixels to modulate at least a portion of the light in response to the indication to produce the modulated beam image, each display pixel being formed from groups of at least two subpixel cells and the first display panel adapted to reorganize the groups to shift positions of the display pixels.

14. The computer system of claim 13, wherein the first display panel comprises:

a switch circuit coupled to the subpixel cells and the control circuit, the switch adapted to selectively couple the subpixel cells together to reorganize at least one of the groups.

15. The computer system of claim 13, further comprising:

additional display panels to modulate at least a portion of the light to produce additional modulated beams image, wherein the first circuit is further adapted to regulate the first display panel to cause the modulated beam image produced by the first display panel to converge with one of the additional beam images.

16. The computer system of claim 13, wherein the first circuit comprises:

an address generator to selectively route signals indicative of the modulated beam image to the first display panel; and a memory adapted to store a map used by the address generator to perform the routing.

17. A display panel comprising:

subpixel cells arranged in substantially the same plane; and a switch circuit to:

form display pixels by grouping the subpixel cells together, each display pixel formed from at least two of the subpixel cells, and change the grouping of the subpixel cells to shift positions of the pixels.

18. The display panel of claim 17, wherein the switch circuit shifts the display pixels by a number equal to or less than the number of subpixel cells that form each display pixel.

19. The display panel of claim 17, wherein the display panel comprises a liquid crystal display panel.

* * * * *